United States Patent
Yamaguchi et al.

(10) Patent No.: US 7,444,984 B2
(45) Date of Patent: Nov. 4, 2008

(54) CONTROL SYSTEM FOR INTERNAL COMBUSTION ENGINE

(75) Inventors: Satoshi Yamaguchi, Wako (JP); Mamoru Hasegawa, Wako (JP); Hideki Sakamoto, Wako (JP); Naoto Kitayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 11/699,560

(22) Filed: Jan. 30, 2007

(65) Prior Publication Data
US 2007/0175437 A1   Aug. 2, 2007

(30) Foreign Application Priority Data
Jan. 31, 2006   (JP)   ............... 2006-021616

(51) Int. Cl.
*F02P 5/15*   (2006.01)
*F02D 41/04*   (2006.01)
*F02M 25/07*   (2006.01)
*G06F 19/00*   (2006.01)

(52) U.S. Cl. ............... 123/406.47; 123/406.48; 123/478; 123/568.12; 701/105

(58) Field of Classification Search .......... 123/294, 123/295, 299, 300, 305, 435, 436, 478, 480, 123/568.11, 568.12, 568.21, 406.45, 406.47, 123/406.48; 701/101–105, 108, 110, 111, 701/115; 60/605.2
See application file for complete search history.

(56) References Cited

U.S. PATENT DOCUMENTS

| | | | | |
|---|---|---|---|---|
| 5,749,334 A | * | 5/1998 | Oda et al. | 123/305 |
| 5,915,357 A | * | 6/1999 | Harada et al. | 123/295 |
| 6,283,096 B1 | * | 9/2001 | Kimura | 123/305 |
| 6,321,716 B1 | * | 11/2001 | Mashiki et al. | 123/295 |
| 6,510,835 B1 | * | 1/2003 | Mizuno et al. | 123/295 |
| 6,606,979 B2 | * | 8/2003 | Kimura | 123/305 |
| 7,062,902 B2 | * | 6/2006 | Nakagawa et al. | 123/299 |

FOREIGN PATENT DOCUMENTS

JP   2004-100566 A   4/2004

* cited by examiner

*Primary Examiner*—Willis R Wolfe, Jr.
(74) *Attorney, Agent, or Firm*—Arent Fox LLP

(57) ABSTRACT

A control system for an internal combustion engine having at least one fuel injection valve for injecting fuel into a combustion chamber of the engine, and an exhaust gas recirculation mechanism for recirculating a portion of exhaust gases from the engine to the combustion chamber. The exhaust gas recirculating mechanism includes an exhaust cooler for cooling the recirculated exhaust gases. A target ignition timing of the fuel injected by the fuel injection valve is calculated. An actual compression ignition timing of the fuel injected by the fuel injection valve is detected. Operation of the exhaust cooler is controlled based on the target ignition timing and the actual compression ignition timing.

6 Claims, 7 Drawing Sheets

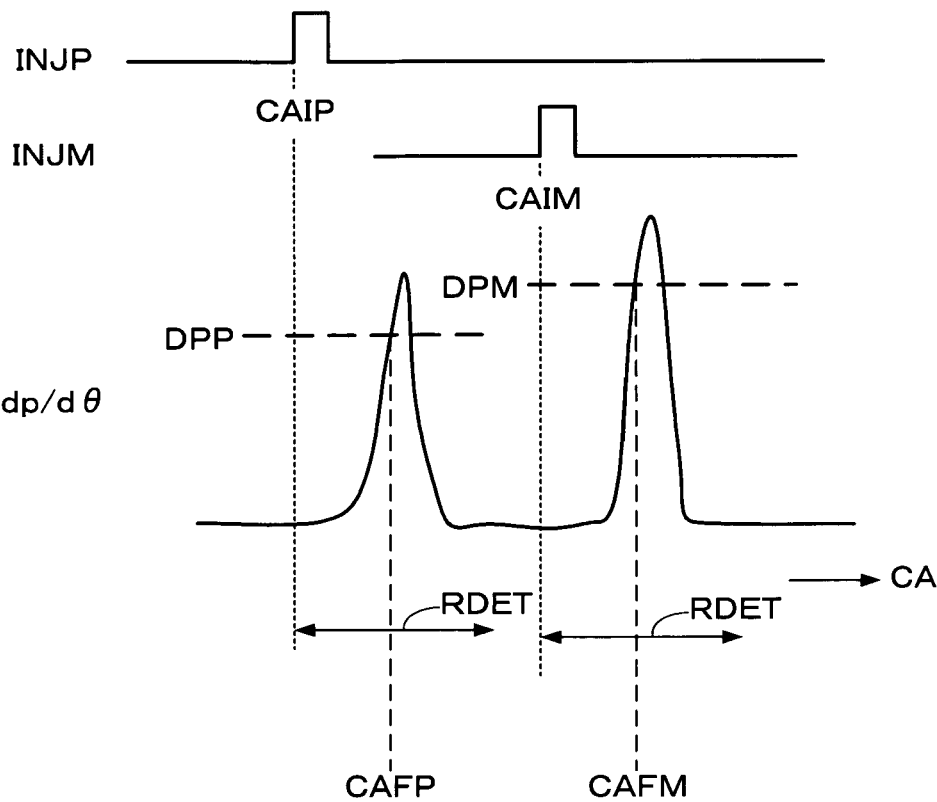
FIG. 7A
FIG. 7B
FIG. 7C
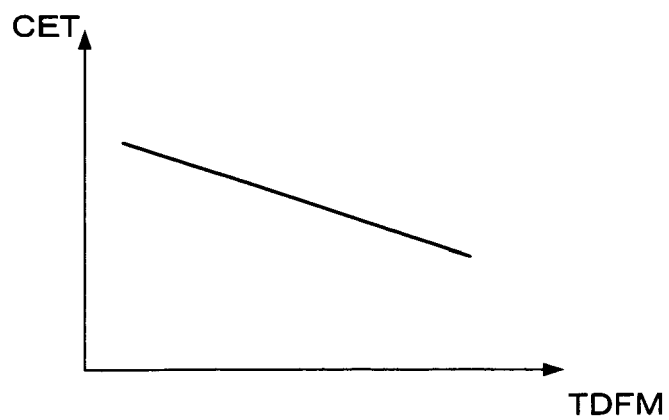
FIG. 8

CONTROL SYSTEM FOR INTERNAL COMBUSTION ENGINE

BACKGROUND OF THE INVENTION

1. Field of the Invention

The present invention relates to a control system for an internal combustion engine and, particularly, to a control system that performs control according to an ignition timing of fuel supplied to the internal combustion engine.

2. Description of the Related Art

Japanese Patent Laid-open No. JP2004-100566 discloses a fuel injection control apparatus in which the cylinder pressure (i.e., pressure in the combustion chamber) is detected by a cylinder pressure sensor. A fuel injection amount, a fuel injection timing, and the like are controlled according to the detected cylinder pressure. According to the disclosed fuel injection control apparatus, a crank angle Cmax, wherein the cylinder pressure has reached a maximum value, is detected, and the fuel injection timing is corrected so that the detected crank angle Cmax coincides with the target value which is previously set according to the engine operating condition.

The cetane number of fuels distributed in the market varies in the range from "40" to "60". Therefore, it is preferable to perform control suitable for the cetane number of the fuel being used by using a plurality of control maps corresponding to the plurality of cetane numbers of the fuels in the market. Under such control, the fuel injection control is more suitably adapted to the fuel being used as the number of control maps used increases.

However, if the number of control maps used increases too much, the problem of the amount of manpower necessary for setting the control maps increases and/or the memory capacity needed for storing the control maps increases.

SUMMARY OF THE INVENTION

The present invention was attained while contemplating the above-described situation, and an aspect of the present invention is to provide a control system for an internal combustion engine which performs the fuel injection control that is suitable for the fuel in use while also suppressing the number of control maps that need to be used.

In order to attain the above aspect, the present invention provides a control system for an internal combustion engine having fuel injection means for injecting fuel into a combustion chamber of the engine. The control system includes fuel injection control means, exhaust gas recirculating means, exhaust cooling means, target ignition timing calculating means, ignition timing detecting means, and exhaust cooling control means. The fuel injection control means controls the fuel injection means. The exhaust gas recirculating means recirculates a portion of exhaust gases from the engine to the combustion chamber. The exhaust cooling means, which is included in the exhaust gas recirculating means, cools the recirculated exhaust gases. The target ignition timing calculating means calculates a target ignition timing (CAFMM) of the fuel injected by the fuel injection means. The ignition timing detecting means detects an actual ignition timing (CAFM) of the fuel injected by the fuel injection means. The exhaust cooling control means controls an operation of the exhaust cooling means based on the target ignition timing (CAFMM) and the actual ignition timing (CAFM).

With the above-described structural configuration, the operation of the exhaust cooling means is controlled based on the target ignition timing and the actual ignition timing. For example, when the delay of the actual ignition timing with respect to the target ignition timing is rather large or prolonged, the actual ignition timing is advanced to a timing near the target ignition timing by stopping the operation of the exhaust cooling means. Further, when the delay of the actual ignition timing with respect to the target ignition timing is rather small or short, or when the actual ignition timing occurs before the target ignition timing, the actual ignition timing is controlled to be near the target ignition timing by operating the exhaust cooling means. Therefore, the actual ignition timing is made to be closer to the target ignition timing, while at the same time suppressing the number of the control maps corresponding to the cetane numbers of fuels.

Preferably, the fuel injection control means has first and second fuel injection timing maps (CAIMM1, CAIMM2), each of which is set according to an operating condition of the engine. The fuel injection control means uses the first fuel injection timing map (CAIMM1) when the exhaust cooling means is not operating or when the exhaust cooling means is operating and a delay (DCAM) of the actual ignition timing with respect to the target ignition timing is greater than a predetermined threshold value (an ignition delay amount corresponding to CETH2). The fuel injection control means uses the second fuel injection timing map (CAIMM2) when the exhaust cooling means is operating and the delay (DCAM) of the actual ignition timing with respect to the target ignition timing is equal to or less than the predetermined threshold value.

With the above-described structural configuration, when the exhaust cooling means is not operating or when the exhaust cooling means is operating and the delay of the actual ignition timing with respect to the target ignition timing is greater than the predetermined threshold value, the ignition timing is controlled using the first fuel injection timing map. When the delay of the actual ignition timing with respect to the target ignition timing is equal to or less than the predetermined threshold value, the ignition timing is controlled using the second fuel injection timing map. Therefore, the actual ignition timing is made to occur closer to the target ignition timing by switching the two fuel injection timing maps and by switching between the operation and stoppage of the exhaust cooling means.

Preferably, the control system further includes pressure detecting means for detecting a pressure in the combustion chamber. The fuel injection control means includes correcting means for correcting a fuel injection timing by the fuel injection means in a retarding direction according to an output ($dp/d\theta$) of the pressure detecting means when the exhaust cooling means is operating.

With the above-described structural configuration, during operation of the exhaust cooling means, the fuel injection timing is corrected in the retarding direction according to the output of the pressure detecting means for detecting the pressure in the combustion chamber. When using the fuel of a high cetane number, there is a possibility that combustion noise may increase if the fuel injection timing is set to a value suitable for the fuel of a lower cetane number. Therefore, such a problem can be avoided by correcting the fuel injection timing in the retarding direction when the output of the pressure detecting means becomes rather large or great.

BRIEF DESCRIPTION OF THE DRAWINGS

FIGS. 7A-7C are time charts showing a detecting method of an ignition timing;

FIG. 8 shows a graph used for calculating a cetane number (CET) from an ignition delay time period (TDFM);

DETAILED DESCRIPTION OF THE PREFERRED EMBODIMENTS

Preferred embodiments of the present invention will now be described with reference to the drawings.

First Embodiment

Figure 1:
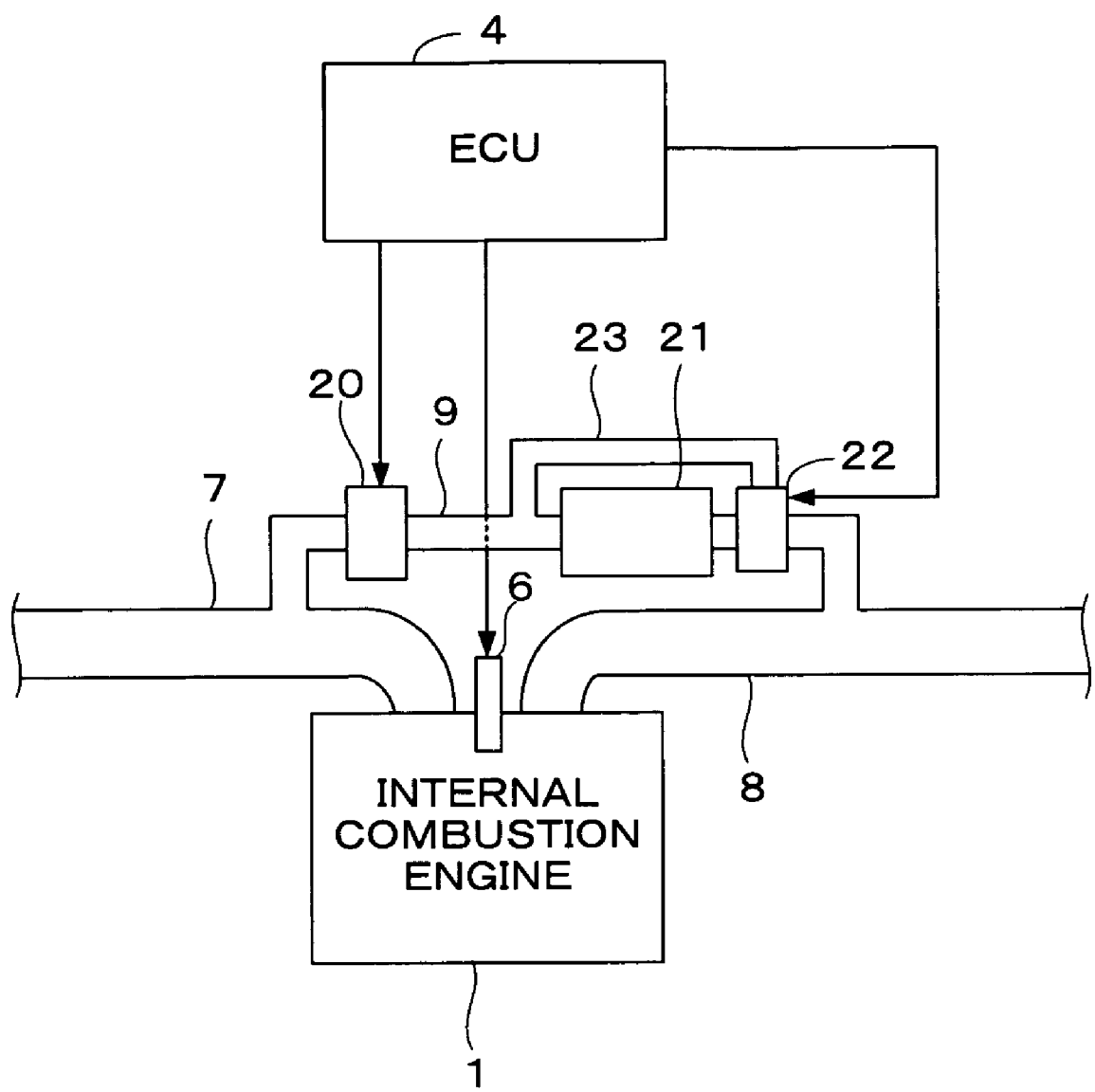
FIG. 1 is a schematic diagram of an internal combustion engine and a control system thereof according to one embodiment of the present invention.
Figure 2:
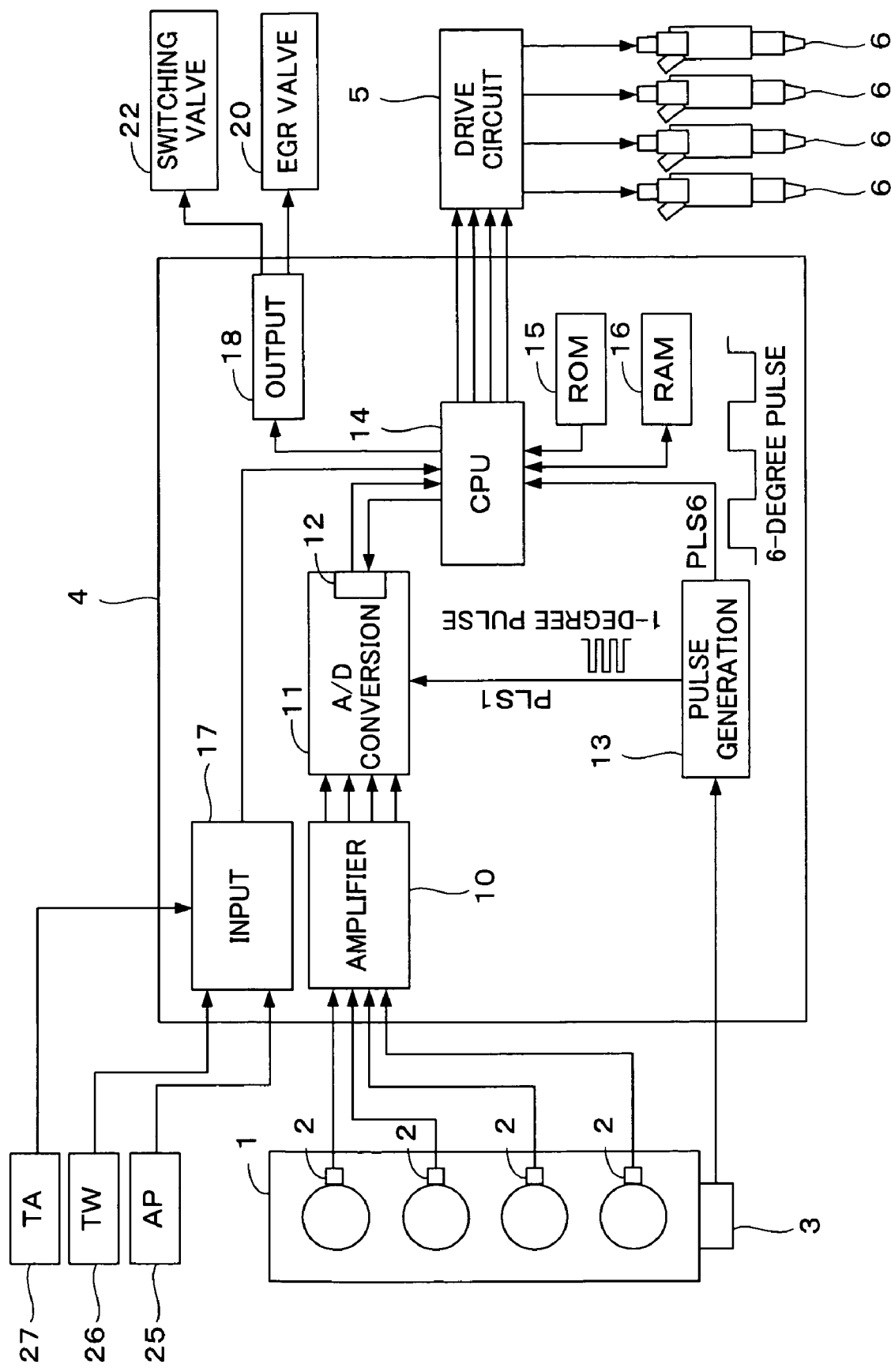
FIG. 2 is a schematic diagram of a part of the control system shown in FIG. 1.

FIGS. 1 and 2 are schematic diagrams showing a configuration of an internal combustion engine and a control system therefor according to one embodiment of the present invention. The internal combustion engine 1 (hereinafter referred to as "engine"), which is a diesel engine, has four cylinders wherein fuel is injected directly into a combustion chamber. The combustion chamber of each cylinder is provided with a fuel injection valve 6 that is electrically connected to an electronic control unit 4 (hereinafter referred to as "ECU"). The ECU 4 controls a valve opening period and a valve opening timing of each fuel injection valve 6. That is, the fuel injection period and fuel injection timing are controlled by the ECU 4.

The engine 1 has an intake pipe 7 and an exhaust pipe 8. An exhaust gas recirculation passage 9 for recirculating a portion of exhaust gases to the intake pipe 7 is provided between the exhaust pipe 8 and the intake pipe 7. The exhaust gas recirculation passage 9 is provided with a recirculated exhaust cooler 21 for cooling recirculated exhaust gases, a bypass passage 23 for bypassing the recirculated exhaust cooler 21, a switching valve 22, and an exhaust gas recirculation control valve 20 (hereinafter referred to as "EGR valve") that controls the amount of exhaust gases that are recirculated. The switching valve 22 switches between a state where the exhaust gas recirculation passage 9 is connected to the recirculated exhaust cooler 21 and a state where the exhaust gas recirculation passage 9 is connected to the bypass passage 23. The EGR valve 20 is an electromagnetic valve having a solenoid. A valve opening of the EGR valve 20 is controlled by the ECU 4. An exhaust gas recirculation mechanism includes the exhaust gas recirculation passage 9, the recirculated exhaust cooler 21, the bypass passage 23, the switching valve 22, and the EGR valve 20.

Each cylinder of the engine 1 is provided with a cylinder pressure sensor 2 that is used for detecting a cylinder pressure (i.e., a pressure in the combustion chamber of the engine 1). In this embodiment, the cylinder pressure sensor 2 is configured in one body together with a grow plug disposed in each cylinder. The detection signal of the cylinder pressure sensor 2 is supplied to the ECU 4. It should be noted that the detection signal of the cylinder pressure sensor 2 corresponds to a differential signal of the cylinder pressure PCYL with respect to the crank angle (time), and the cylinder pressure PCYL is obtained by integrating the output of the cylinder pressure sensor.

The engine 1 is provided with a crank angle position sensor 3 for detecting a rotation angle of the crankshaft (not shown) of the engine 1. The crank angle position sensor 3 generates one pulse at every 1 degree of the crank angle, wherein the pulse is supplied to the ECU 4. The crank angle position sensor 3 further generates a cylinder discrimination pulse at a predetermined crank angle for a specific cylinder of the engine 1 and supplies the cylinder discrimination pulse to the ECU 4.

An accelerator sensor 25 for detecting an operation amount AP of the accelerator pedal of the vehicle driven by the engine 1, a coolant temperature sensor 26 for detecting a coolant temperature TW of the engine 1, and an intake air temperature sensor 27 for detecting an intake air temperature TA of the engine 1 are connected to the ECU 4. The detection signals of the sensors 25-27 are supplied to the ECU 4.

The ECU 4 provides a control signal of the fuel injection valve 6 to a drive circuit 5. The drive circuit 5 is connected to the injection valves 6, and supplies drive signals according to the control signal from the ECU 4 to the fuel injection valves 6. Fuel is thereby injected into the combustion chamber of each cylinder at the fuel injection timing in accordance with the control signal output from the ECU 4. The fuel injection amount is controlled to the value in accordance with the control signal from the ECU 4.

The ECU 4 includes an amplifier 10, an A/D conversion block 11, a pulse generation block 13, a CPU 14 (Central Processing Unit), a ROM 15 (Read Only Memory) for storing programs executed by the CPU 14, a RAM 16 (Random Access Memory) for storing calculation results, and the like, an input circuit 17, and an output circuit 18. The detection signal of the cylinder pressure sensor 2 is input to the amplifier 10 which amplifies the input signal. The signal amplified by the amplifier 10 is input to the A/D conversion block 11. The pulse signal output from the crank angle position sensor 3 is input to the pulse generation block 13.

The A/D conversion block 11, which includes a buffer 12, converts the cylinder pressure sensor output from the amplifier 10 to a digital value $dp/d\theta$ (hereinafter referred to as "pressure change rate") and stores the converted digital value $dp/d\theta$ in the buffer 12. Specifically, a pulse signal PLS1 (hereinafter referred to as "one-degree pulse") having a crank angle period of one degree is supplied to the A/D conversion block 11 from the pulse generation block 13, the cylinder pressure sensor output is sampled at the intervals of the one-degree pulse PLS1 to be converted to a digital value, and the digital value is stored in the buffer 12.

A pulse signal PLS6 having a crank angle period of six degrees is supplied to the CPU 14 from the pulse generation block 13. The CPU 14 performs a process for reading the digital value stored in the buffer 12 at intervals of the six-degree pulse PLS6. That is, in the present embodiment, the A/D conversion block 11 does not request an interrupt to the CPU 14, but the CPU 14 performs the reading process at intervals of the six-degree pulse PLS6.

The input circuit 17 converts the detection signals from various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a target exhaust gas recirculation amount GEGR according to the engine operating condition and supplies a duty control signal for controlling an opening of the EGR valve 20 according to the target exhaust gas recirculation amount GEGR to the EGR valve 20 through the output circuit 18. Further, the CPU 14 determines a cetane number of the fuel in use and performs switching control of the switching valve 22 according to the determined cetane number. If the switching valve 22 is switched to the recirculated exhaust cooler 21 side, a cooling of the recirculated exhaust gases is performed. On the other hand, if the switching valve 22 is switched to the bypass passage 23 side, the cooling of the recirculated exhaust gases is not performed.

Figure 3:
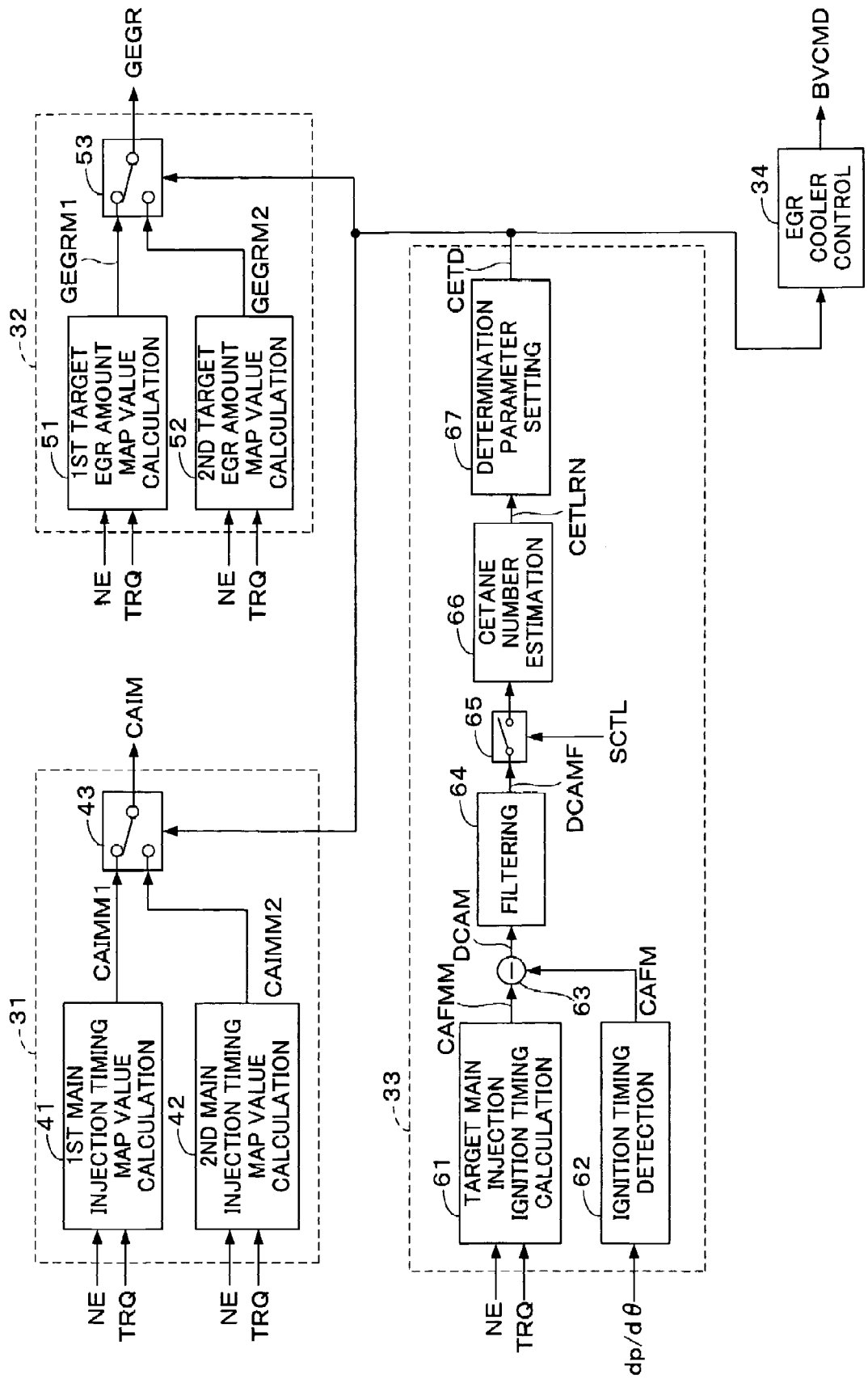
FIG. 3 is a block diagram of a module for calculating the main injection timing (CAIM) and the target exhaust gas recirculation amount (GEGR)

FIG. 3 is a block diagram showing a configuration of a module which calculates a main injection timing CAIM of the fuel injection valve 6 and the target exhaust gas recirculation amount GEGR (hereinafter referred to as "target EGR amount). The function of the module is realized by the processes executed by the CPU 14.

The module shown in FIG. 3 includes a main injection timing calculation block 31 for calculating the main injection timing CAIM, a target EGR flow rate calculation block 32 for calculating a target exhaust gas recirculation amount GEGR, a cetane number determination block 33 for estimating a cetane number CET of the fuel in use and outputting a determined cetane number parameter CETD according to the estimated cetane number, and an EGR cooler control block 34. In this embodiment, the cetane number of the fuel in use is estimated in view of the cetane number of the fuels distributed in the market. When the estimated cetane number CET is equal to or less than a first threshold value CETH1 (for example, 44), a determined cetane number parameter CETD is set to "1". When the estimated cetane number CET is greater than the first threshold value CETH1 and is equal to or less than a second threshold value CETH2 (for example, 50), the determined cetane number parameter CETD is set to "2". When the estimated cetane number CET is greater than the second threshold value CETH2, the determined cetane number parameter CETD is set to "3".

The main injection timing calculation block 31 includes a first main injection timing map value calculation block 41, a second main injection timing map value calculation block 42, and a switching block 43. The first main injection timing map value calculation block 41 retrieves a CAIMM1 map, which is previously set according to the engine rotational speed NE and the demand torque TRQ, to calculate a first main injection timing map value CAIMM1. The CAIMM1 map is set based on the fuel of the cetane number CET3 (for example, 57) being greater than the second threshold value CETH2. The second main injection timing map value calculation block 42 retrieves a CAIMM2 map, which is previously set according to the engine rotational speed NE and the demand torque TRQ, to calculate a second main injection timing map value CAIMM2. The CAIMM2 map is set based on the fuel of the cetane number CET2 (for example, 46) which is between the first threshold value CETH1 and the second threshold value CETH2. The cetane number CET2 is an average cetane number of the fuels distributed in the market.

The switching block 43 selects the first main injection timing map value CAIMM1 or the second main injection timing map value CAIMM2 according to the determined cetane number parameter CETD and outputs the selected map value as a main injection timing CAIM. Specifically, when the determined cetane number parameter CETD is equal to "1" or "2", the second main injection timing map value CAIMM2 is selected. When the determined cetane number parameter CETD is equal to "3", the first main injection timing map value CAIMM1 is selected.

The target EGR flow rate calculation block 32 includes a first target EGR amount map value calculation block 51, a second target EGR amount map value calculation block 52, and a switching block 53. The first target EGR amount map value calculation block 51 retrieves a GEGRM1 map, which is previously set according to the engine rotational speed NE and the demand torque TRQ, to calculate a first target EGR amount map value GEGRM1. The GEGRM1 map is set based on the fuel of the cetane number CET3. The second target EGR amount map value calculation block 52 retrieves GEGRM2 map, which is previously set according to the engine rotational speed NE and the demand torque TRQ, to calculate a second target EGR amount map value GEGRM2. The GEGRM2 map is set based on the fuel of the cetane number CET2.

The switching block 53 selects the first target EGR amount map value GEGRM1 or the second target EGR amount map value GEGRM2 according to the determined cetane number parameter CETD and outputs the selected map value as a target EGR flow rate GEGR. Specifically, when the determined cetane number parameter CETD is equal to "1" or "2", the second target EGR amount map value GEGRM2 is selected. When the determined cetane number parameter CETD is equal to "3", the first target EGR amount map value GEGRM1 is selected.

The cetane number determination block 33 includes a target main injection ignition timing calculation block 61, an ignition timing detection block 62, a subtracting block 63, a filtering block 64, a switching block 65, a cetane number estimation block 66, and a determination parameter setting block 67.

The target main injection ignition timing calculation block 61 retrieves a CAFMM map, which is previously set according to the engine rotational speed NE and the demand torque TRQ, to calculate a target main injection ignition timing CAFMM. The CAFMM map is set based on the fuel of the above-described cetane number CET2 (for example, 46).

The ignition timing detection block 62 detects a main injection ignition timing CAFM according to the pressure change rate $dp/d\theta$ obtained by converting the output signal of the cylinder pressure sensor 2 to a digital value. The detection method thereof will be described later with reference to FIGS. 5-7C. The subtracting block 63 subtracts the main injection ignition timing CAFM from the target main injection ignition timing CAFMM to calculate an ignition delay angle DCAM.

The filtering block 64 performs filtering using the least-squares calculation method or the moving averaging calculation of data of the ignition delay angle DCAM obtained in a comparatively long time period (e.g., 10-60 seconds) to calculate a filtered ignition delay angle DCAMF. The switching block 65 is on/off controlled by a switching control signal SCTL set by a process shown in FIG. 4 which is described below. The switching block 65 is turned off when the switching control signal SCTL is "0", and turned on when the switching control signal SCTL is "1". The switching control signal SCTL is set to "1" when an execution condition of the cetane number estimation is satisfied.

The cetane number estimation block 66 converts the ignition delay angle DCAMF to an ignition delay time period TDFM using the engine rotational speed NE and retrieves a CET table shown in FIG. 8 according to the ignition delay time period TDFM to calculate the cetane number CET. The cetane number estimation block 66 applies the cetane number CET to equation (1) to calculate a cetane number learning value CETLRN.

$$CETLRN = \alpha \times CET + (1-\alpha) \times CETLRN \quad (1)$$

where α is an averaging coefficient set to a value between "0" and "1", and the CETLRN on the right side is a preceding calculated value.

When refueling, the cetane number learning value CETLRN is initialized to the cetane number CET2 that corresponds to the average cetane number of the fuels distributed in the market and converges to the value indicative of the cetane number of the fuel in use upon subsequent learning.

The cetane number learning value CETLRN described above is calculated using all of the cylinder pressure sensor outputs corresponding to four cylinders. Therefore, an averaging of the cetane number CET detected in each cylinder and the cetane numbers CET, whose detection timings are different from each other, is performed by equation (1). When the cetane number estimation process is not executed, the latest cetane number learning value CETLRN of the stored learning values is output from the cetane number estimation block 66.

Figure 9:
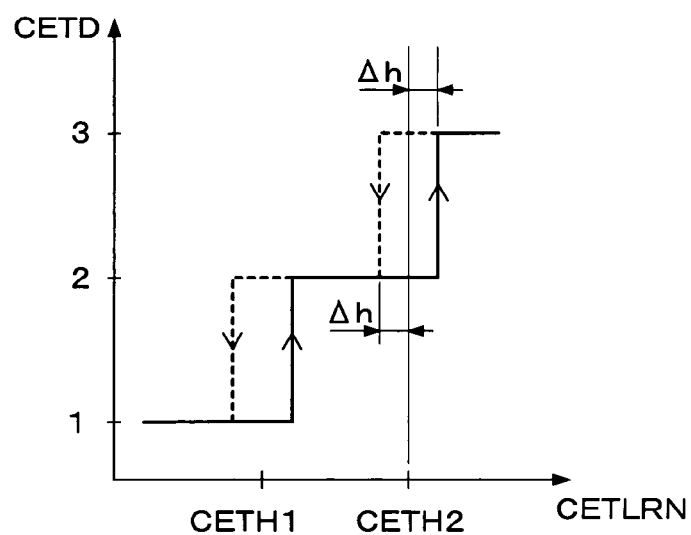
FIG. 9 is a graph showing a setting method of the determined cetane number parameter (CETD) according to the cetane number learning value (CETLRN)

The determination parameter setting block 67 sets the determined cetane number parameter CETD according to the cetane number learning value CETLRN. Specifically, as shown in FIG. 9, the cetane number learning value CETLRN is compared with the first threshold value CETH1 and the second threshold value CETH2 with the hysteresis. That is, if a parameter (hereinafter referred to as "hysteresis parameter") for adding the hysteresis is indicated by "Δh", the determined cetane number parameter CETD is changed to "3" when the determined cetane number parameter CETD is "2" and the cetane number learning value CETLRN exceeds the value obtained by adding the hysteresis parameter Δh to the second threshold value CETH2. Further, the determined cetane number parameter CETD is changed to "2" when the determined cetane number parameter CETD is equal to "3" and the cetane number learning value CETLRN becomes lower than the value obtained by subtracting the hysteresis parameter Δh from the second threshold value CETH2. With respect to the first threshold value CETH1, a similar determination is made to set the determined cetane number parameter CETD.

The EGR cooler control block 34 outputs a switching control signal BVCMD to the switching valve 22 according to the determined cetane number parameter CETD. Specifically, the switching control signal BVCMD, which switches the switching valve 22 to the bypass passage 23 side, is output when the determined cetane number parameter CETD is equal to "1". The switching control signal BVCMD, which switches the switching valve 22 to the recirculated exhaust cooler 21 side, is output when the determined cetane number parameter CETD is equal to "2" or "3".

Figure 4:
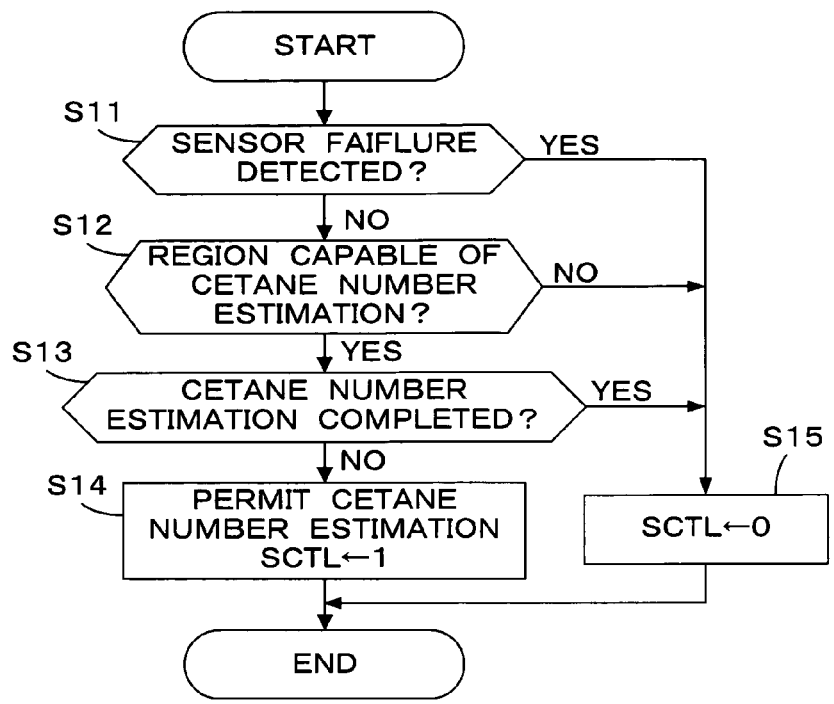
FIG. 4 is a flowchart of a process for setting the switching control signal (SCTL) shown in FIG. 3.

Next, the setting of the switching control signal SCTL is explained with reference to FIG. 4. The switching control signal setting process shown in FIG. 4 is executed at predetermined time intervals in the CPU 14.

In step S11, it is determined whether any failure of the sensors (e.g., the crank angle position sensor 3, the accelerator sensor 21, the cylinder pressure sensor 2) necessary for the cetane number estimation process is detected. If the answer to step S11 is affirmative (YES), the switching control signal SCTL is set to "0" (step S15). If no failure of the sensors is detected, it is determined whether the engine operating condition is in a predetermined operating region (for example, a region where the engine rotational speed NE is within the range from 1000 to 3000 rpm and the demand torque TRQ is within the range from 0 to 250 Nm) in which the cetane number estimation is performed (step S12). If the answer to step S12 is negative (NO), the process proceeds to step S15 described above. If the engine operating condition is in the predetermined operating region, it is determined whether the cetane number estimation is completed (step S13). Since the answer to step S13 is negative (NO) at first, the cetane number estimation process is permitted, i.e., the switching control signal SCTL is set to "1" (step S14). Thereafter, when the estimation process is completed, the process proceeds to step S15 from step S13.

Figure 5:
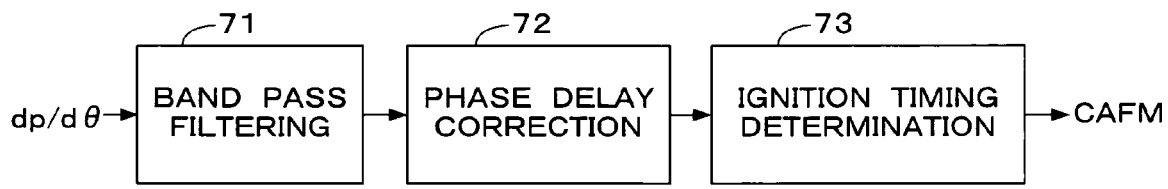
FIG. 5 is a block diagram of the ignition timing detection block shown in FIG. 3.
Figure 6:
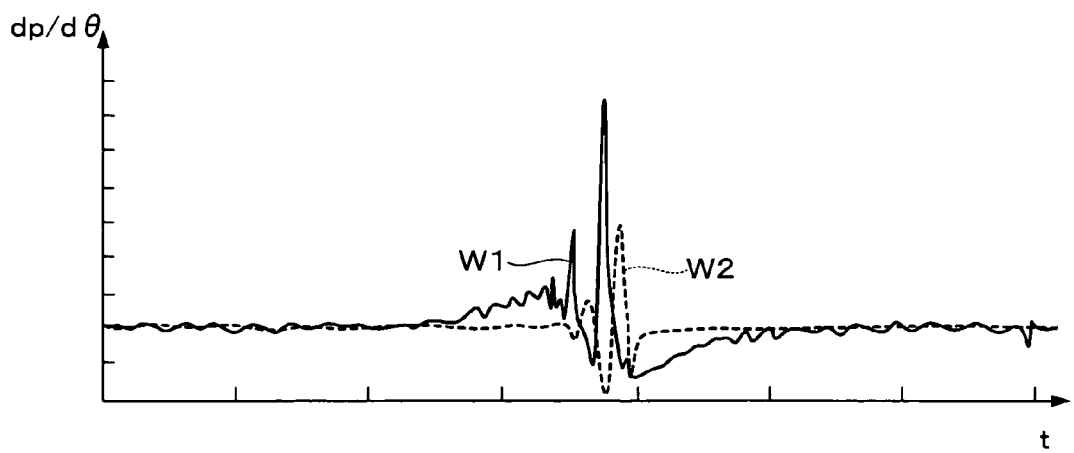
FIG. 6 is a time chart showing a band pass filtering of a cylinder pressure sensor output.

FIG. 5 is a block diagram showing a configuration of the ignition timing detection block 62. The ignition timing detection block 62 includes a band pass filtering block 71, a phase delay correction block 72, and an ignition timing determination block 73. The pressure change rate dp/dθ output from the cylinder pressure sensor 2 is input to the band pass filtering block 71. In FIG. 6, the waveform W1 shows an input waveform, and the waveform W2 shows an output waveform. The phase delay occurring in the band pass filtering block 71 is corrected in the phase delay correction block 72.

The ignition timing determination block 73 determines a crank angle position CAFP (hereinafter referred to as "pilot injection ignition timing") at which the pressure change rate dp/dθ takes a peak value corresponding to the pilot injection and a crank angle position CAFM (hereinafter referred to as "main injection ignition timing") at which the pressure change rate dp/dθ takes another peak value corresponding to the main injection. Specifically, as shown in FIG. 7C, the crank angle position at which the pressure change rate dp/dθ output from the phase delay correction block 72 exceeds a pilot detection threshold value DPP is determined to be the pilot injection ignition timing CAFP, and the crank angle position at which the pressure change rate dp/dθ exceeds a main detection threshold value DPM is determined to be the main injection ignition timing CAFM. In this embodiment, only the main injection ignition timing CAFM is used for estimating the cetane number CET.

In FIGS. 7A and 7B, a pilot injection pulse INJP started from a crank angle position CAIP and a main injection pulse INJM started from a crank angle position CAIM are shown. In FIG. 7C, an angle position range RDET (for example, 10 degrees), where the ignition timings CAFP and CAFM are detected, is shown. By limiting the detection angle position range RDET to a comparatively narrow range, as shown in FIG. 7C, the ignition timing is accurately determined without increasing calculation load on the CPU 14.

Figure 10:
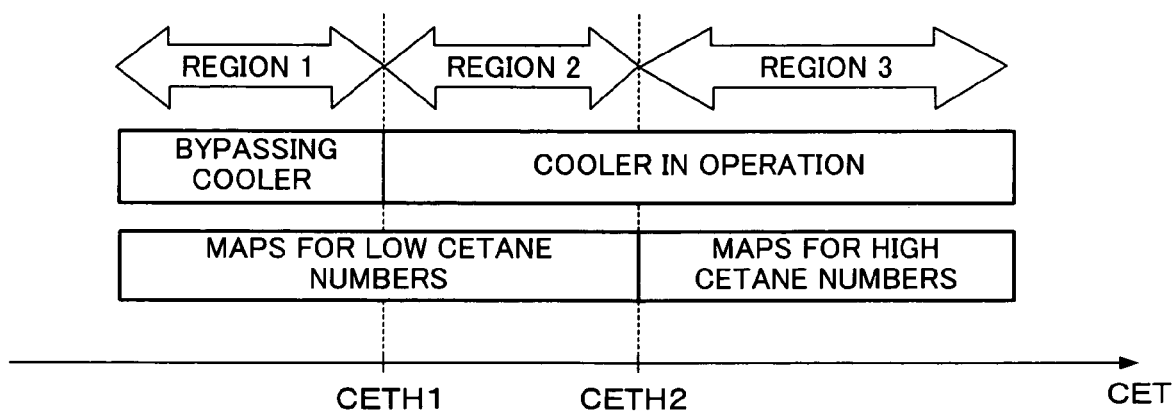
FIG. 10 is a schematic diagram showing the control method in the first embodiment.

FIG. 10 is a diagram illustrating a fuel injection control, an exhaust gas recirculation amount control, and a recirculated exhaust cooling control in this embodiment. Region 1 of FIG. 10 shows a cetane number region where the determined cetane number parameter CETD is equal to "1", Region 2 shows a cetane number region where the determined cetane number parameter CETD is equal to "2", and Region 3 shows a cetane number region where the determined cetane number parameter CETD is equal to "3".

In Region 1, the fuel injection control and the exhaust gas recirculation amount control are performed using maps for low cetane numbers, i.e., using the second main injection timing map value CAIMM2 and the second target EGR amount map value GEGRM2, and cooling of the recirculated exhaust gases is not performed. By stopping the cooling of the recirculated exhaust gases, ignitionability of the fuel of a cetane number lower than the cetane number CET2, which is a reference for setting the maps for fuels of low cetane numbers, is improved.

In Region 2, the fuel injection control and the exhaust gas recirculation amount control are performed using the maps for fuels of low cetane numbers, i.e., the second main injection timing map value CAIMM2 and the second target EGR amount map value GEGRM2, and the cooling of recirculated exhaust gases is performed. In Region 2, the cetane number CET2 used as the reference for setting the maps for fuels of low cetane numbers (CAIMM2 map and GEGRM2 map) is included. By using the maps for fuels of low cetane numbers and performing the cooling of recirculated exhaust gases, optimal fuel injection control and exhaust gas recirculation amount control is performed.

In Region 3, the fuel injection control and the exhaust gas recirculation amount control are performed using the maps for fuels of high cetane numbers, i.e., the first main injection timing map value CAIMM1 and the first target EGR amount map value GEGRM1, and the cooling of recirculated exhaust gases is performed. In Region 3, the cetane number CET3 used as the reference for setting the maps for fuels of high cetane numbers (CAIMM1 map and GEGRM1 map) is included. By using the maps for fuels of high cetane numbers and performing the cooling of recirculated exhaust gases, optimal fuel injection control and exhaust gas recirculation amount control is performed.

As described above, in this embodiment, the controls corresponding to the three regions of fuel are performed using the two maps and according to whether the cooling of recirculated exhaust gases is performed or not. Consequently, the actual ignition timing is made closer to the target ignition timing, and the exhaust gas recirculation amount control is appropriately performed, while suppressing the number of control maps corresponding to the cetane number of fuels.

In this embodiment, the fuel injection valve 6 corresponds to the fuel injection means; the recirculated exhaust cooler 21 and the switching valve 22 correspond to the exhaust cooling means; the exhaust gas recirculation passage 9, the exhaust gas recirculation control valve 20, the recirculated exhaust cooler 21, the bypass passage 23, and the switching valve 22 define the exhaust gas recirculating means; and the ECU 4 forms the fuel injection control means, the target ignition timing calculating means, a portion of the ignition timing detecting means, and the exhaust cooling control means. Specifically, the main injection timing calculation block 31 of FIG. 3 corresponds to the fuel injection control means. The target main injection ignition timing calculation block 61 corresponds to the target ignition timing calculating means. The ignition timing detection block 62 corresponds to a portion of the ignition timing detecting means, and the EGR cooler control block 34 corresponds to the exhaust cooling control means. The state where the switching valve 22 is switched to the recirculated exhaust cooler 21 side corresponds to the state where the exhaust cooling means is operating, and the state where the switching valve 22 is switched to the bypass passage 23 side corresponds to the state where the exhaust cooling means is not operating.

Second Embodiment

Figure 11:
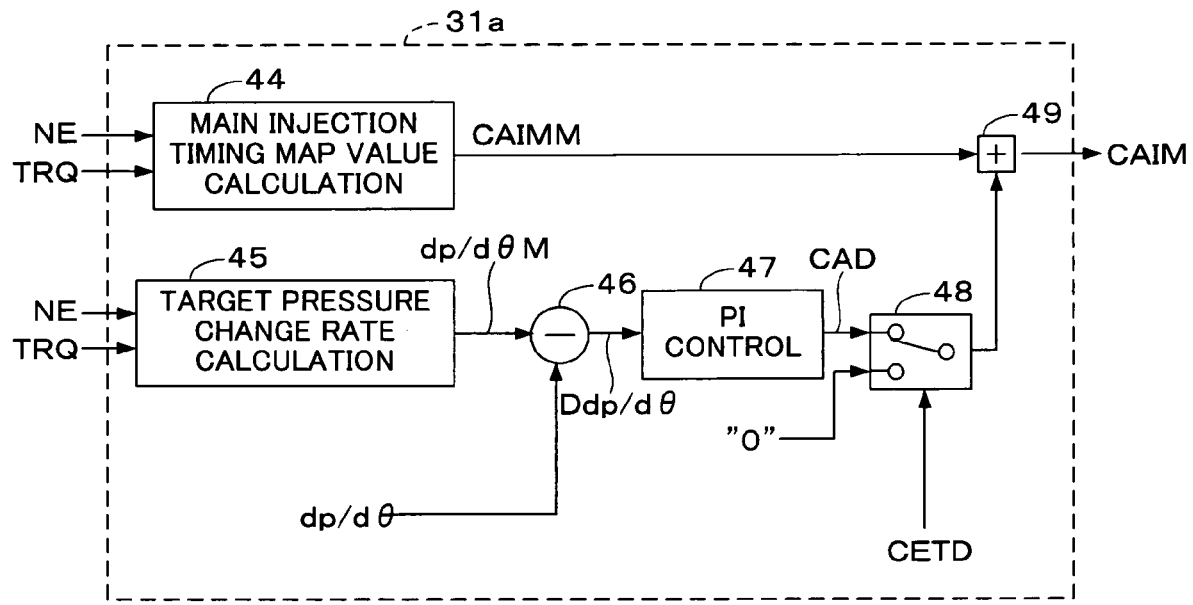
FIG. 11 is a block diagram showing a configuration of the injection timing calculation block according to a second embodiment of the present invention.

This embodiment is obtained by replacing the main injection timing calculation block 31 shown in FIG. 3 with a main injection timing calculation block 31a shown in FIG. 11. Except for this difference, the structure of the second embodiment is the same as in the first embodiment. The main injection timing calculation block 31a shown in FIG. 11 includes a main injection timing map value calculation block 44, a target pressure change rate calculation block 45, a subtracting block 46, a PI control block 47, a switching block 48, and an adding block 49.

The main injection timing map value calculation block 44, like the second main injection timing map value calculation block 42 shown in FIG. 3, retrieves the CAIMM map, which is set based on the cetane number CET2 (for example, 46) according to the engine rotational speed NE and the demand torque TRQ, to calculate a main injection timing map value CAIMM.

The target pressure change rate calculation block 45 retrieves a $dp/d\theta M$ map according to the engine rotational speed NE and the demand torque TRQ to calculate a target pressure change rate $dp/d\theta M$. The $dp/d\theta M$ map is set so that the combustion noise does not become excessively large in a high load operating condition. The subtracting block 46 subtracts the pressure change rate $dp/d\theta$ from the target pressure change rate $dp/d\theta M$ to calculate a pressure change rate deviation $Ddp/d\theta$.

The PI control block 47 calculates a correction amount CAD of the main injection timing with the PI (proportional/integral) control method so that the pressure change rate deviation $Ddp/d\theta$ may become "0". The switching block 48 selects the correction amount CAD or "0" according to the determined cetane number parameter CETD. Specifically, if the determined cetane number parameter CETD is equal to "1" or "2", the value "0" is output. If the determined cetane number parameter CETD is equal to "3", the correction amount CAD is output.

The adding block 49 adds the correction amount CAD to the main injection timing map value CAIMM to calculate the fuel injection timing CAIM. For example, if the detected pressure change rate $dp/d\theta$ becomes greater than the target pressure change rate $dp/d\theta M$, the pressure change rate deviation $Ddp/d\theta$ takes a negative value and the absolute value of the pressure change rate deviation $Ddp/d\theta$ increases. The correction amount CAD is then set to a negative value corresponding to the pressure change rate deviation $Ddp/d\theta$. The absolute value of the correction amount CAD is controlled to increase as the absolute value of the pressure change rate deviation $Ddp/d\theta$ increases. As such, the main injection timing map value CAIMM is corrected in the retarding direction, i.e., the direction in which the pressure change rate $dp/d\theta$ decreases, and the pressure change rate $dp/d\theta$ is controlled to converge to the target pressure change rate $dp/d\theta M$.

Figure 12:
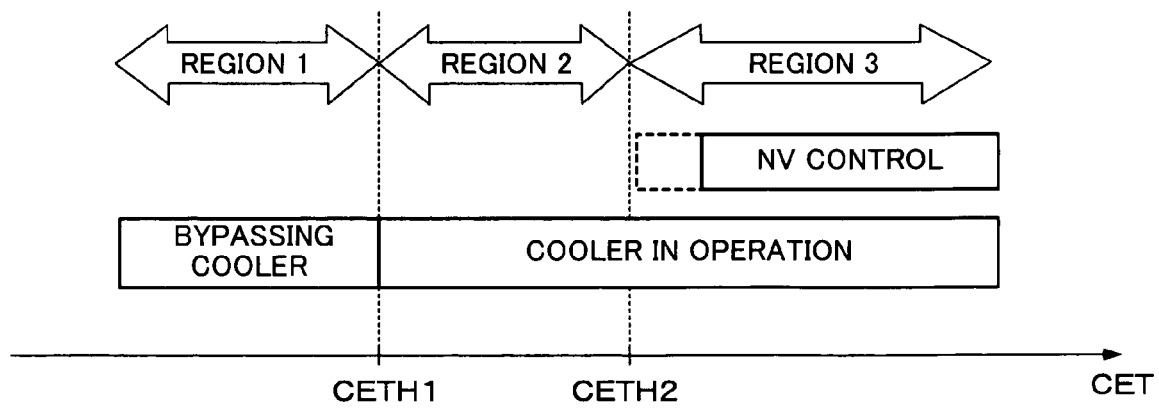
FIG. 12 is a schematic diagram showing the control method of the second embodiment.

FIG. 12 is a diagram showing the fuel injection control and recirculated exhaust cooling control in this embodiment. In this embodiment, the CAIMM map is a map for fuels of low cetane numbers (i.e., a map based on the fuel of the cetane number CET2). The controls in Regions 1 and 2 are substantially the same as those of the first embodiment.

In Region 3, the fuel injection control is performed using the CAIMM map (the map for fuels of low cetane numbers). Further, the control (NV control) for reducing the combustion noise is performed by controlling the pressure change rate $dp/d\theta$ in a feedback manner to the target pressure change rate $dp/d\theta M$. Therefore, the combustion noise is suppressed even if the maps for fuels of low cetane numbers are used.

As described above, in this embodiment, only one map for calculating the fuel injection timing is used, and the control (NV control) for reducing the combustion noise is performed with respect to the high cetane number fuel of which the determined cetane number parameter CETD is "3". Consequently, the number of the control maps is further reduced compared with the first embodiment, while suppressing the problem of combustion noise.

In this embodiment, the main injection timing calculation block 31a corresponds to the fuel injection control means.

The present invention is not limited to the embodiments described above, and various modifications may be made thereto. For example, in the embodiments described above, the estimated cetane number CET of the fuel in use is calculated according to the ignition delay angle DCAM obtained by subtracting the detected ignition timing CAFM from the target main injection ignition timing CAFMM. Further, the fuel injection control, the exhaust gas recirculation control, and the recirculated exhaust cooling control are performed according to the estimated cetane number CET. Alternatively, the fuel injection control, the exhaust gas recirculation control, and the recirculated exhaust cooling control may be performed according to the ignition delay time period TDFM.

Further, in the above-described second embodiment, the NV control is performed by controlling the pressure change rate $dp/d\theta$ in a feedback manner to the target pressure change rate $dp/d\theta M$. Alternatively, a more simplified control method may be adopted. That is, the fuel injection timing may be corrected in the retard direction when the detected pressure change rate $dp/d\theta$ exceeds a predetermined change rate $dp/d\theta X$ (for example, 0.5 MPa/deg).

Further, in the above-described embodiments, the actual ignition timing CAFM is detected as a timing at which the pressure change rate $dp/d\theta$ detected by the cylinder pressure sensor 2 exceeds the detection threshold value DPM. Alternatively, the actual ignition timing CAFM may be determined as a timing at which the heat release rate reaches a value of 50% of the maximum value.

In the above-described embodiments, the present invention is described with regard to a 4-cylinder diesel internal combustion engine. However, the present invention can be implemented in a diesel internal combustion engine having another number of cylinders, or a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having fuel injection means for injecting fuel into a combustion chamber of said engine, said control system comprising:
    fuel injection control means for controlling said fuel injection means;
    exhaust gas recirculating means for recirculating a portion of exhaust gases from said engine to said combustion chamber;
    exhaust cooling means for cooling the exhaust gases that are recirculated, wherein said exhaust cooling means is included in said exhaust gas recirculating means;
    target ignition timing calculating means for calculating a target ignition timing of the fuel injected by said fuel injection means;
    ignition timing detecting means for detecting an actual compression ignition timing of the fuel injected by said fuel injection means; and
    exhaust cooling control means for controlling an operation of said exhaust cooling means based on the target ignition timing and the actual compression ignition timing;
    wherein said fuel injection control means has first and second fuel injection timing maps which are set according to an operating condition of said engine, wherein said fuel injection control means uses the first fuel injection timing map when said exhaust cooling means is not operating or when said exhaust cooling means is operating and a delay of the actual compression ignition timing with respect to the target ignition timing is greater than a predetermined threshold value, and wherein said fuel injection control means uses the second fuel injection timing map when said exhaust cooling means is operating and the delay of the actual compression ignition timing with respect to the target ignition timing is equal to or less than the predetermined threshold value.

2. A control method for an internal combustion engine having at least one fuel injection valve which injects fuel into a combustion chamber of said engine, and an exhaust gas recirculation mechanism which recirculates a portion of exhaust gases from said engine to said combustion chamber, said exhaust gas recirculating mechanism including an exhaust cooler for cooling the exhaust gases that are recirculated, said control method comprising the steps of:
    a) calculating a target ignition timing of the fuel injected by said at least one fuel injection valve;
    b) detecting an actual compression ignition timing of the fuel injected by said at least one fuel injection valve; and
    c) controlling an operation of said exhaust cooler based on the target ignition timing and the actual compression ignition timing,
    wherein the fuel injection by said at least one fuel injection valve is controlled using first and second fuel injection timing maps, which are set according to an operating condition of said engine, wherein the first fuel injection timing map is used when said exhaust cooler is not operating or when said exhaust cooler is operating and a delay of the actual compression ignition timing with respect to the target ignition timing is greater than a predetermined threshold value, and wherein the second fuel injection timing map is used when said exhaust cooler is operating and the delay of the actual compression ignition timing with respect to the target ignition timing is equal to or less than the predetermined threshold value.

3. A control system for an internal combustion engine having fuel injection means for injecting fuel into a combustion chamber of said engine, said control system comprising:
    fuel injection control means for controlling said fuel injection means;
    exhaust gas recirculating means for recirculating a portion of exhaust gases from said engine to said combustion chamber;
    exhaust cooling means for cooling the exhaust gases that are recirculated, wherein said exhaust cooling means is included in said exhaust gas recirculating means;
    target ignition timing calculating means for calculating a target ignition timing of the fuel injected by said fuel injection means;
    ignition timing detecting means for detecting an actual compression ignition timing of the fuel injected by said fuel injection means;
    exhaust cooling control means for controlling an operation of said exhaust cooling means based on the target ignition timing and the actual compression ignition timing; and
    pressure detecting means for detecting a pressure in said combustion chamber, wherein said fuel injection control means includes correcting means for correcting a fuel injection timing of said fuel injection means in a retarding direction according to an output of said pressure detecting means when said exhaust cooling means is operating.

4. The control system according to claim 3, wherein said correcting means corrects the fuel injection timing so that a change rate of the pressure in said combustion chamber coincides with a target pressure change rate set according to an operating condition of said engine.

5. A control method for an internal combustion engine having at least one fuel injection valve which injects fuel into a combustion chamber of said engine, and an exhaust gas recirculation mechanism which recirculates a portion of exhaust gases from said engine to said combustion chamber, said exhaust gas recirculating mechanism including an exhaust cooler for cooling the exhaust gases that are recirculated, said control method comprising the steps of:

a) calculating a target ignition timing of the fuel injected by said at least one fuel injection valve;
b) detecting an actual compression ignition timing of the fuel injected by said at least one fuel injection valve; and
c) controlling an operation of said exhaust cooler based on the target ignition timing and the actual compression ignition timing; and
(d) detecting a change rate of a pressure in said combustion chamber, wherein a fuel injection timing by said at least one fuel injection valve is corrected in a retarding direction according to the detected change rate when said exhaust cooler is operating.

6. The control method according to claim 5, wherein the fuel injection timing is corrected so that the detected change rate coincides with a target pressure change rate set according to an operating condition of said engine.

* * * * *